(12) United States Patent
Prociw (10) Patent No.: US 10,041,679 B2
(45) Date of Patent: Aug. 7, 2018

(54) COMBUSTION SYSTEMS

(71) Applicant: Delavan Inc, West Des Moines, IA (US)

(72) Inventor: Lev A. Prociw, Johnston, IA (US)

(73) Assignee: DELAVAN INC, West Des Moines, IA (US)

(*) Notice: Subject to any disclaimer, the term of this patent is extended or adjusted under 35 U.S.C. 154(b) by 327 days.

(21) Appl. No.: 14/749,275

(22) Filed: Jun. 24, 2015

(65) Prior Publication Data

US 2016/0377292 A1  Dec. 29, 2016

(51) Int. Cl.
| | |
|---|---|
| F23R 3/28 | (2006.01) |
| F23R 3/50 | (2006.01) |
| F23R 3/60 | (2006.01) |
| F23R 3/00 | (2006.01) |

(52) U.S. Cl.
CPC .............. *F23R 3/286* (2013.01); *F23R 3/002* (2013.01); *F23R 3/50* (2013.01); *F23R 3/60* (2013.01); *F23R 2900/00017* (2013.01)

(58) Field of Classification Search
None
See application file for complete search history.

(56) References Cited

U.S. PATENT DOCUMENTS

| | | | | |
|---|---|---|---|---|
| 5,419,115 A | * | 5/1995 | Butler | F23R 3/10 60/740 |
| 5,524,430 A | * | 6/1996 | Mazeaud | F23R 3/283 60/752 |
| 5,816,049 A | * | 10/1998 | Joshi | F23C 7/004 60/737 |
| 5,966,937 A | * | 10/1999 | Graves | F23C 7/004 239/400 |
| 6,164,074 A | | 12/2000 | Madden et al. | |
| 6,334,298 B1 | * | 1/2002 | Aicholtz | F23R 3/283 60/750 |
| 7,856,826 B2 | * | 12/2010 | Brown | F23R 3/10 60/752 |
| 8,365,533 B2 | | 2/2013 | Johnson et al. | |

(Continued)

FOREIGN PATENT DOCUMENTS

EP  2530383 A1  12/2012

OTHER PUBLICATIONS

Partial European Search Report, issued in corresponding European Patent Application No. EP 16175884.2 dated Nov. 11, 2016.

(Continued)

*Primary Examiner* — Ehud Gartenberg
*Assistant Examiner* — Stephanie Cheng
(74) *Attorney, Agent, or Firm* — Locke Lord LLP; Scott D. Wofsy; Joshua L. Jones (57) ABSTRACT

A combustor for a gas turbine engine includes an inner combustor wall and an outer combustor wall radially outboard of the inner combustor wall. The inner and outer combustor walls define a combustion space therebetween with an upstream inlet and a downstream outlet. A combustor dome connects between inner and outer combustor walls at the upstream inlet of the combustion space. The combustor dome includes a plurality of circumferentially spaced apart nozzles and a plurality of tiles mounted to the combustor dome to fluidly separate a downstream side of the combustor dome from an upstream side of the combustor dome.

11 Claims, 9 Drawing Sheets

(56) References Cited

U.S. PATENT DOCUMENTS

| | | | |
|---|---|---|---|
| 8,893,382 B2 | 11/2014 | Patterson et al. | |
| 8,943,835 B2* | 2/2015 | Corsmeier | F23R 3/002 60/753 |
| 2007/0193273 A1* | 8/2007 | DeVane | F23R 3/002 60/752 |
| 2008/0115499 A1 | 5/2008 | Patel et al. | |
| 2009/0019856 A1* | 1/2009 | Commaret | F23R 3/002 60/752 |
| 2013/0004906 A1* | 1/2013 | Brown | F23R 3/14 431/354 |
| 2013/0036739 A1* | 2/2013 | Horikawa | F23R 3/28 60/735 |

OTHER PUBLICATIONS

Extended European Search Report, of the European Patent Office, dated Feb. 15, 2017, in corresponding European Patent Application No. 16175884.2.

\* cited by examiner

COMBUSTION SYSTEMS

BACKGROUND OF THE INVENTION

1. Field of the Invention

The present disclosure relates to combustion, and more particularly to combustion systems such as used in gas turbine engines.

2. Description of Related Art

A variety of devices and methods are known in the art for combustion. Of such devices, many are directed to combustion for gas turbine engines. Traditionally, fuel in gas turbine engines is supplied through fuel injectors for combustion within a combustor. The fuel injectors were connected to the upstream wall, or combustor dome, of the combustor and were required to be small enough to be removed without opening the engine case completely. This allowed for frequent changing out of injectors. But more and more demanding performance requirements are driving an increasing trend towards injectors with larger and larger nozzles.

Such conventional methods and systems have generally been considered satisfactory for their intended purpose. However, there is still a need in the art for improved combustion systems. The present disclosure provides a solution for this need.

SUMMARY OF THE INVENTION

A combustion system including a combustor dome including a plurality of circumferentially spaced apart nozzles. The system also includes a plurality of tiles mounted to the combustor dome to fluidly separate a downstream side of the combustor dome from an upstream side of the combustor dome.

Each tile can be mounted around a respective one of the nozzles. Each tile can be spaced apart from the respective one of the nozzles in an axial direction between the upstream and downstream sides of the combustor dome to define an outer air circuit between the tile and the respective one of the nozzles. Each nozzle can include a downstream insulation shell with a standoff extending in a downstream direction from the nozzle, wherein the standoff spaces the tile from the nozzle to maintain space for the outer air circuit. Each tile can include a radial slot that receives the standoff. Each tile can define a converging frustoconical surface that defines a portion of the outer air circuit.

Each nozzle can include a radial swirler on the upstream side of the combustor dome in fluid communication with a nozzle outlet on the downstream side of the combustor dome, wherein an inner air circuit is defined from the radial swirler to the nozzle outlet. The inner and outer air circuits can be configured to issue 40% to 50% of airflow passing through the combustor dome through the inner air circuit, and to issue 50% to 60% of the airflow through the outer air circuit, wherein the total airflow of the inner and outer airflow circuits does not exceed 100%. Struts can support each nozzle in the combustor dome and obstruct flow only to the outer air circuit wherein the inner air circuit is unobstructed by the struts. A channel forming the inlet of the outer air circuit can be proximate an upstream surface of the tile for cooling of the tile by airflow passing into the outer air circuit.

Each tile can be confined axially with the combustor dome. The tiles can be confined axially by an outer bayonet ring proximate a radially outer perimeter defined by the tiles, and by an inner bayonet ring proximate a radially inner perimeter defined by the tiles, wherein each of the bayonet rings is interlocked with bayonet features in respective inner and outer rings of the combustor dome.

A combustor for a gas turbine engine includes an inner combustor wall and an outer combustor wall radially outboard of the inner combustor wall. The inner and outer combustor walls define a combustion space therebetween with an upstream inlet and a downstream outlet. A combustor dome as described above connects between inner and outer combustor walls at the upstream inlet of the combustion space.

The tiles can be confined axially by an outer bayonet ring proximate a radially outer perimeter defined by the tiles, and by an inner bayonet ring proximate a radially inner perimeter defined by the tiles, wherein each of the bayonet rings is interlocked with bayonet features in respective inner and outer rings of the combustor dome, wherein the outer bayonet ring slidingly supports a cold side combustor liner of the outer combustor wall, and wherein the inner bayonet ring slidingly supports a cold side combustor liner of the inner combustor wall. It is also contemplated that the outer bayonet ring can form a cold side combustor liner of the outer combustor wall, and the inner bayonet ring can form a cold side combustor liner of the inner combustor wall.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
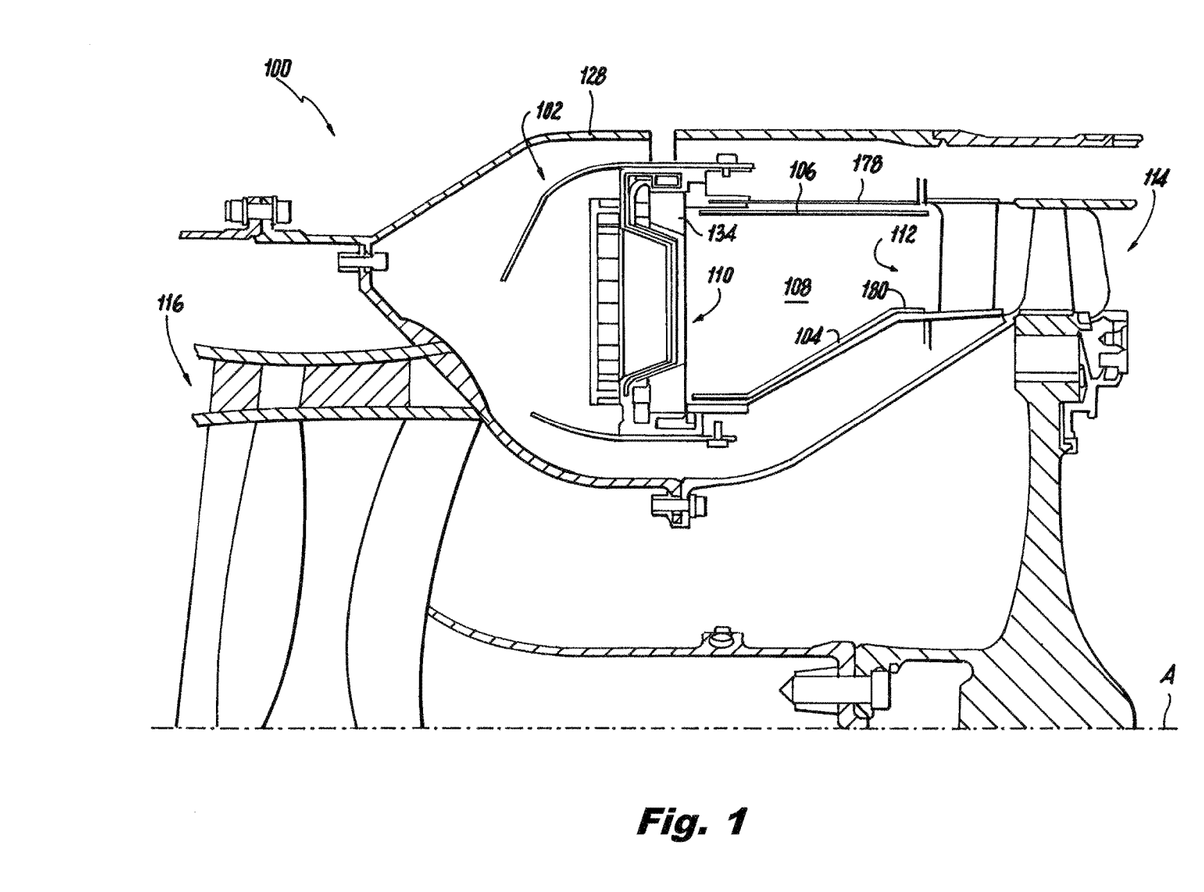
FIG. 1 is a cross-sectional side elevation view of an exemplary embodiment of a combustion system constructed in accordance with the present disclosure, showing a combustor in fluid communication between a compressor and a turbine in a gas turbine engine.

Reference will now be made to the drawings wherein like reference numerals identify similar structural features or aspects of the subject disclosure. For purposes of explanation and illustration, and not limitation, a partial view of an exemplary embodiment of a combustion system in accordance with the disclosure is shown in FIG. 1 and is designated generally by reference character 100. Other embodiments of combustion systems in accordance with the disclosure, or aspects thereof, are provided in FIGS. 2-13, as will be described. The systems and methods described herein can be used for combustion in gas turbine engines.

Combustion system 100 for a gas turbine engine includes a combustor dome 102 connecting between the inner and outer combustor walls 104 and 106, respectively, to form a combustor. Outer combustor wall 106 is radially outboard of inner combustor wall 104, such that the inner and outer combustor walls 104 and 106 define an annular combustion space 108 therebetween with an upstream inlet 110 at combustor dome 102, e.g., for receiving fuel and compressed air, and a downstream outlet 112, e.g., for providing pressurized combustion products to a downstream turbine 114. Compressor 116 is connected in fluid communication with combustor dome 102 to provide compressor discharge air to the inlet 110 of the combustion space 108. Compressor 116, combustor dome 102, and turbine 114 are annular components centered on engine centerline axis A.

Figure 2:
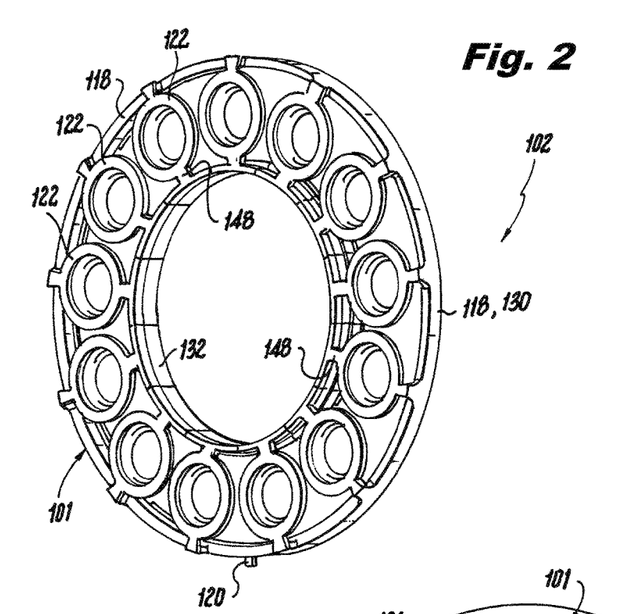
FIG. 2 is a perspective view of a portion of the combustion system of FIG. 1, showing a combustor dome with integrated fuel manifold and nozzle components.

Referring now to FIG. 2, combustor dome 102 includes a frame 101 with an integral fuel manifold 118 having an inlet 120 and nozzle components 122 of a plurality of nozzles circumferentially spaced around combustor dome 102. Fuel manifold 118 and nozzle components 122 are integrated with the combustor dome 102 for fluid communication from inlet 120 to the nozzle components 122. Those skilled in the art will readily appreciate that with the fuel manifold 118 and nozzle components 122 integrated into the combustor dome 102, the traditional nozzle feed arms extending from outside the combustor and extensive fuel manifolding external to the combustor for feeding each nozzle are eliminated.

Inlet 120 is radially outboard of the nozzle components 122 for supplying fuel to the manifold from a source external to the combustor dome. A flexible fitting 124 can be used to connect inlet 120 with the fuel source, e.g. by way of a fuel control system. If required for a given application, multiple fittings 124 and inlets 120 can be used. Radially inserted slip pins 126 can be used to support combustor dome 102 from engine case 128, so as to accommodate differential thermal expansion and contraction between combustor dome 102 and the surrounding components such as engine case 128 (shown in FIG. 1) and the fuel systems connected by fitting 124.

Figure 3:
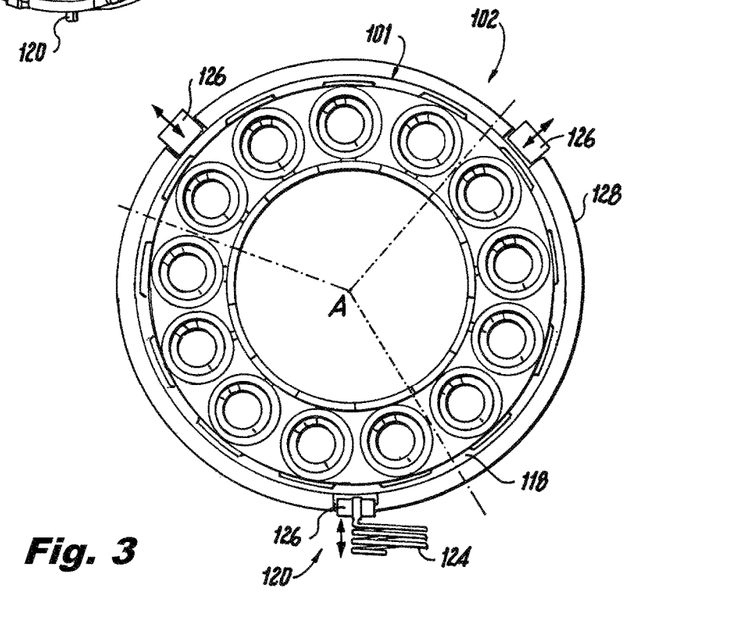
FIG. 3 is an axial outlet end view of the combustor dome of FIG. 2.

With continued reference to FIGS. 2 and 3, frame 101 includes inner and outer combustor dome rings 132 and 130. Fuel manifold 118 can form the outer combustor dome ring 130, wherein the nozzle components 122 extend inward from the outer combustor dome ring radially inward to an inner combustor dome ring 132. The inner combustor dome ring 132 is circumferentially segmented, with one segment per nozzle, to accommodate thermal expansion and contraction of the combustor dome. Another way of accommodating thermal expansion and contraction in combustor dome 102 in addition to or in lieu of segmenting inner ring 132 is to segment the entire combustor dome, e.g., along the dashed lines in FIG. 3, wherein each segment would have its own inlet 120 and separate manifold 118 for feeding its subset of nozzles. The structure of combustor dome 102 as shown in FIGS. 2 and 3 can be fabricated and brazed, additively manufactured, e.g., complete with internal nozzle details, or can be produced using any other suitable processes.

Figure 4:
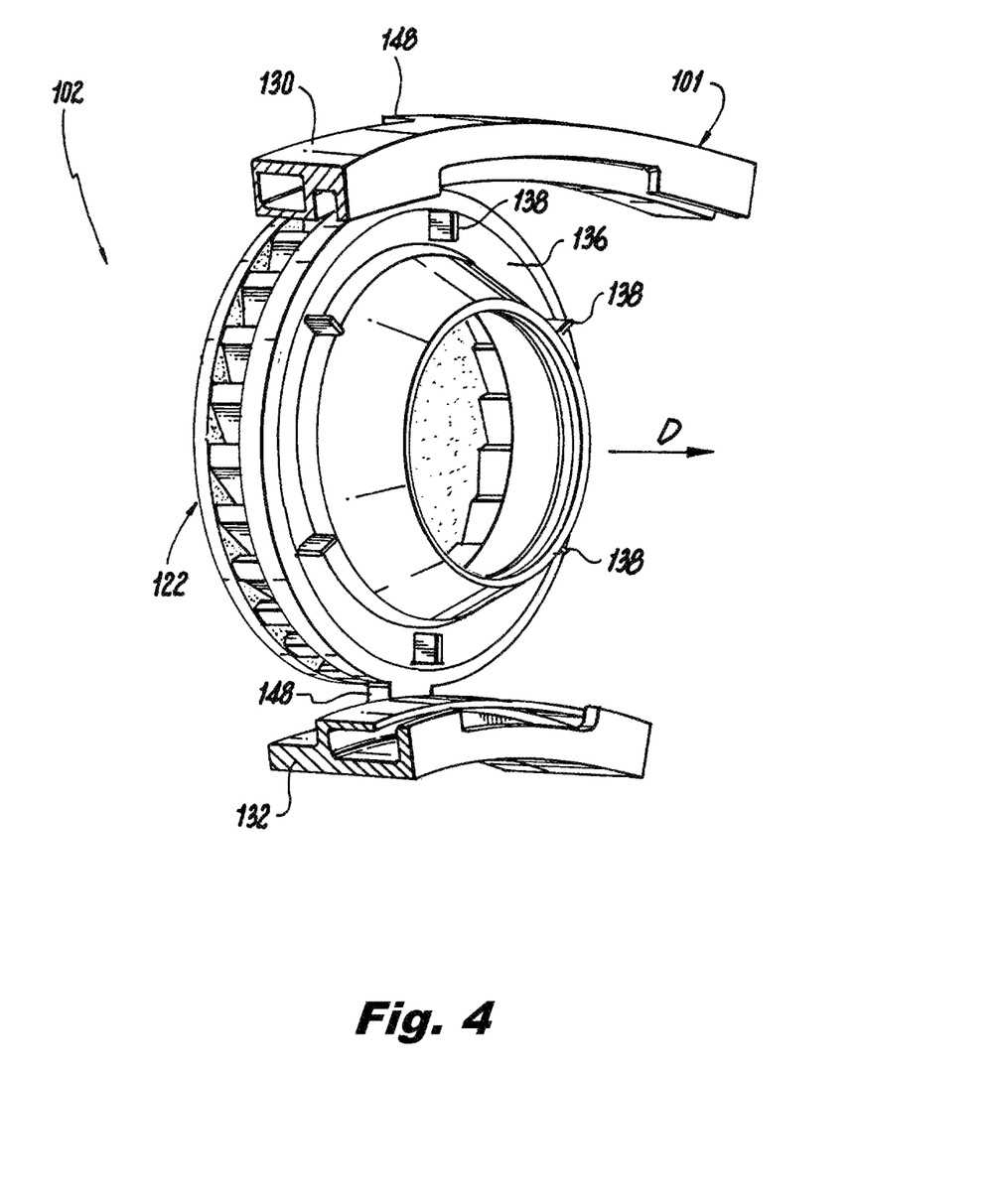
FIG. 4 is a perspective view of a portion of the combustion system of FIG. 1, showing standoffs for spacing a tile of the combustor dome from one of the nozzles.
Figure 5:
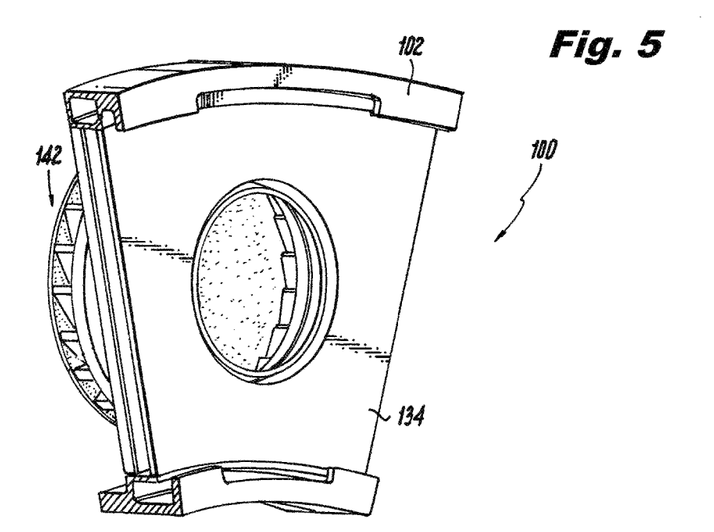
FIG. 5 is a perspective view of the portion of the combustion system of FIG. 4, showing the tile assembled into the frame of the combustor dome.

With reference now to FIG. 4, a portion of combustion system 100 is shown tile 134 removed (tile 134 can be seen in FIG. 1). Combustion system 100 includes a plurality of tiles 134 mounted to the frame 101 of combustor dome 102 to fluidly separate a downstream side of the combustor dome 102 from an upstream side of the combustor dome 102. Nozzle components 122 of each nozzle include a downstream insulation shell 136 with standoffs 138 extending in a downstream direction D from the nozzle, i.e., the axial direction between the upstream and downstream sides of the combustor dome 102. When the tile 134 is assembled onto combustor dome 102, as shown in FIG. 5, the standoffs 138 spaces the tile 134 apart from the nozzle to maintain space defining an outer air circuit 140 of the nozzle between tile 134 and shell 136 of the nozzle, as indicated in FIG. 6.

Figure 6:
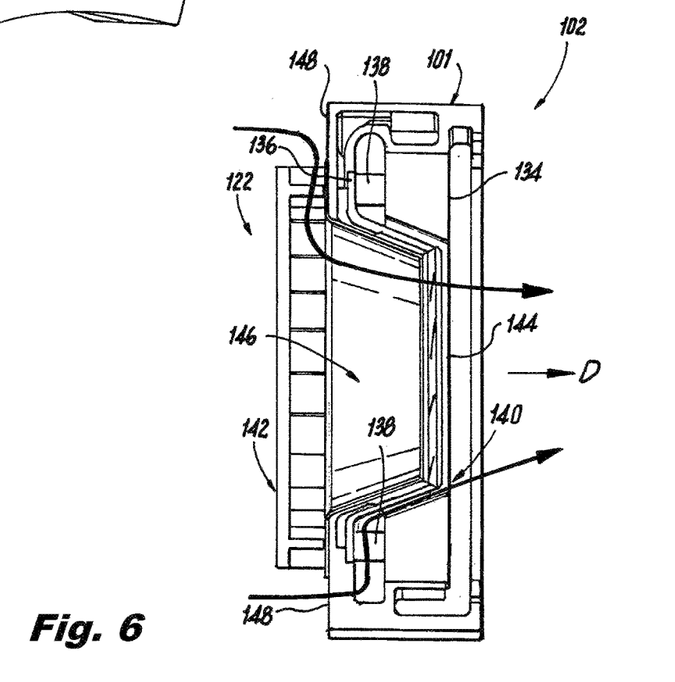
FIG. 6 is a radial cross-sectional view of the portion of the combustion system of FIG. 5, showing the inner and outer air circuits.
Figure 7:
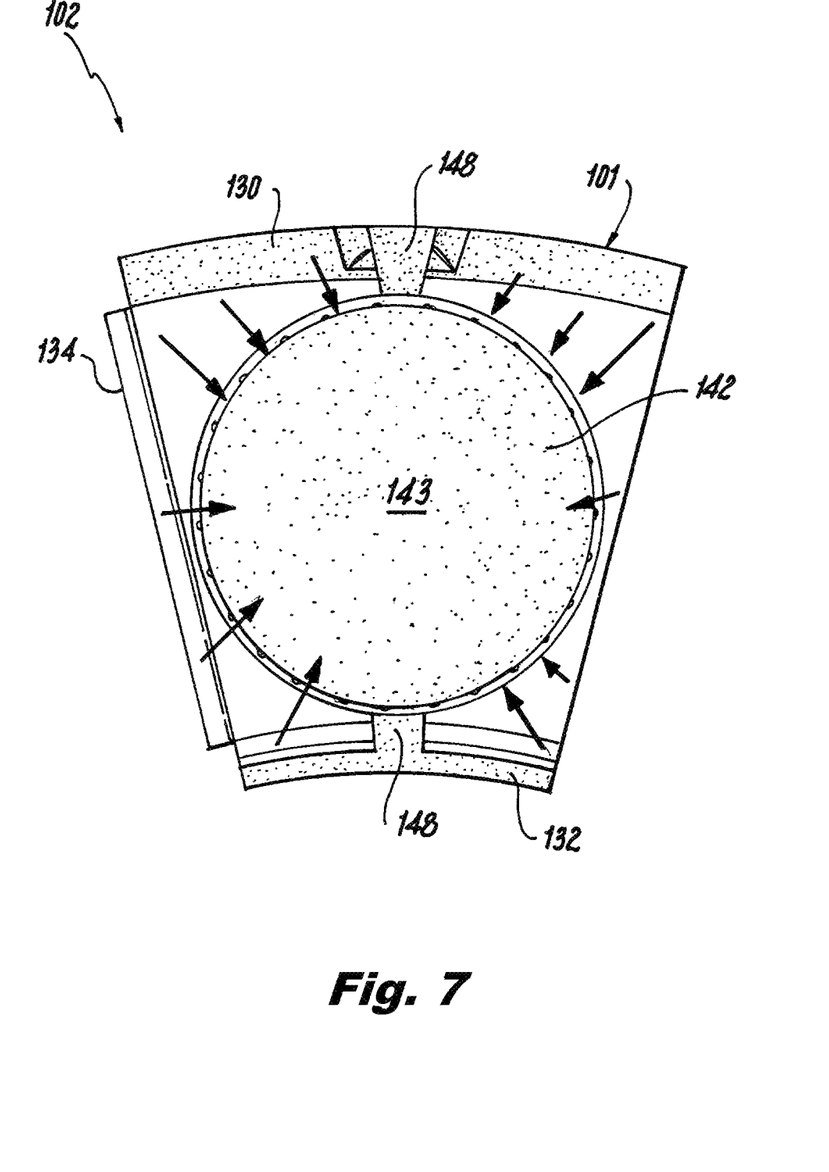
FIG. 7 is a perspective view of the portion of the combustion system of FIG. 5, schematically showing air flow into the radial swirler cooling the upstream side of the tile.

With continued reference to FIG. 6, each tile 134 is mounted around a respective one of the nozzles. The nozzle components 122 of each nozzle include a radial swirler 142 on the upstream side of combustor dome 102 in fluid communication with a nozzle outlet 144 on the downstream side of combustor dome 102. An inner air circuit 146 is defined from radial swirler 142 to nozzle outlet 144. Inner and outer air circuits 142 and 140 are configured to issue 40% to 50% of airflow passing through combustor dome 102 through the inner air circuit 146, and to issue 50% to 60% of the airflow through the outer air circuit 140, wherein the total airflow of the inner and outer airflow circuits does not exceed 100%. Substantially all of the air supplied to the combustor space 108 enters by way of the nozzles of combustor dome 102. Those skilled in the art will readily appreciate that the air flow splits above can be adjusted as required on an application by application basis without departing from the scope of this disclosure.

Struts 148, also shown in FIGS. 2 and 4, support each nozzle in the frame 101 of combustor dome 102 and only modestly obstruct flow, e.g., air discharged from compressor 116, only to the outer air circuit 140. The inner air circuit 146 and radial swirler 142 are unobstructed by struts 148. As viewed from the upstream side in FIG. 7, the radial channel 141 labeled in FIGS. 4-6, forming the inlet for outer air circuit 140 is located intimate and proximate the upstream surface of tile 134 for cooling of the tile 134 by airflow passing into the outer air circuit 140. The proximity of the channel 141 of outer air circuit 140 ensures high flow along the upstream surface of tile 134 and this large quantity of air flowing radially into the nozzle scrubs the back side of the tile 134, cooling it from the back side before the air enters the combustion volume 108. This cooling flow is indicated schematically by the converging arrows in FIG. 7. The back side wall 143 of radial swirler 142 can be made of a composite material, or any other suitable material.

Figure 8:
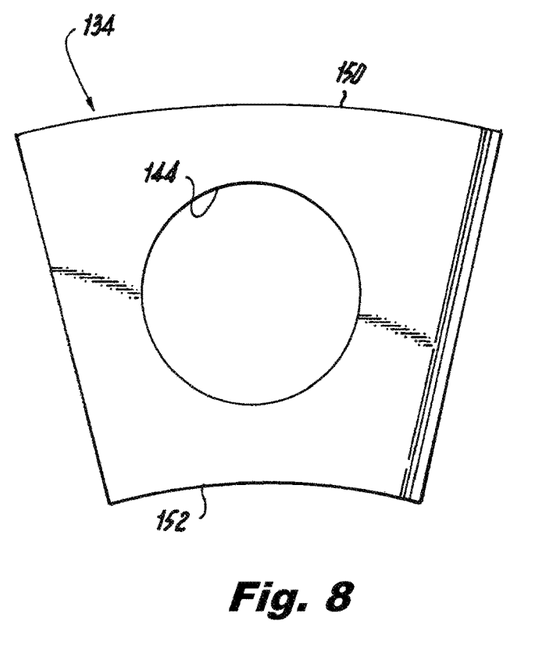
FIG. 8 is an axial elevation view of the tile of FIG. 5, showing the downstream or hot side of the tile.
Figure 9:
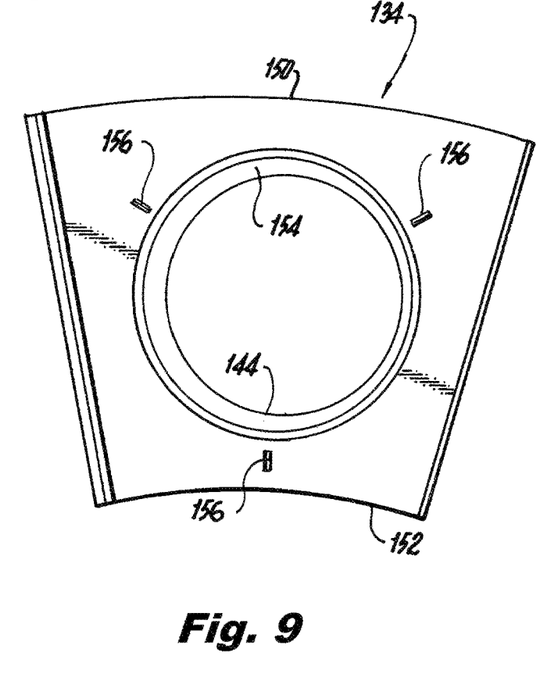
FIG. 9 is an axial elevation view of the tile of FIG. 8, showing the upstream or cold side of the tile.

With reference now to FIG. 8, tile 134 has a segment-shaped profile with a radially outer perimeter 150 and opposed radially inner perimeter 152. The downstream surface of tile 134 that is shown in FIG. 8 defines a circular outlet 144 for the outer air circuit 140, so outlet 144 is dimensioned to conform to the requirement for nozzle air flow. As shown in FIG. 9, tile 134 defines a converging frustoconical surface 154 that defines a portion of the outer air circuit 140 shown in FIG. 6. Tile 134 is thus integrated into the nozzle as one of the nozzle components 122. Tile 134 includes radial slots 156 that receive the standoff 138 that are shown in FIG. 4. Slots 156 maintain concentricity between the nozzle and tile 134.

Figure 10:
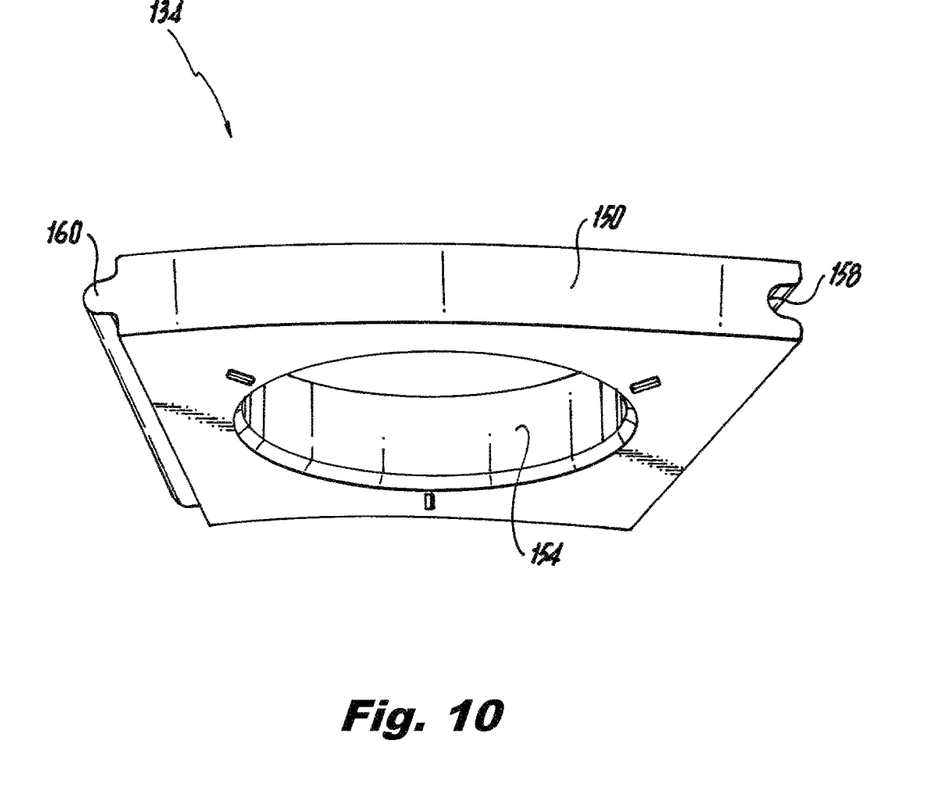
FIG. 10 is a perspective view of the tile of FIG. 8, showing the tongue and groove for circumferential assembly with other tiles.

As shown in FIG. 10, each tile 134 include a radial edge with a radially extending groove 158 defined therein. Each tile 134 also includes a radial edge with a radially extending tongue 160 thereon. With all of the tiles 134 engaged around the circumference of combustor dome 102, each tile 134 engages circumferentially adjacent tiles 134 wherein the tongues 160 are engaged in the grooves 158. The tongue and groove arrangement allows circumferential positional adjustment of tiles 134, reducing or eliminating radial growth arising from thermal expansion, while maintaining a seal between the adjacent tiles 134.

Figure 11:
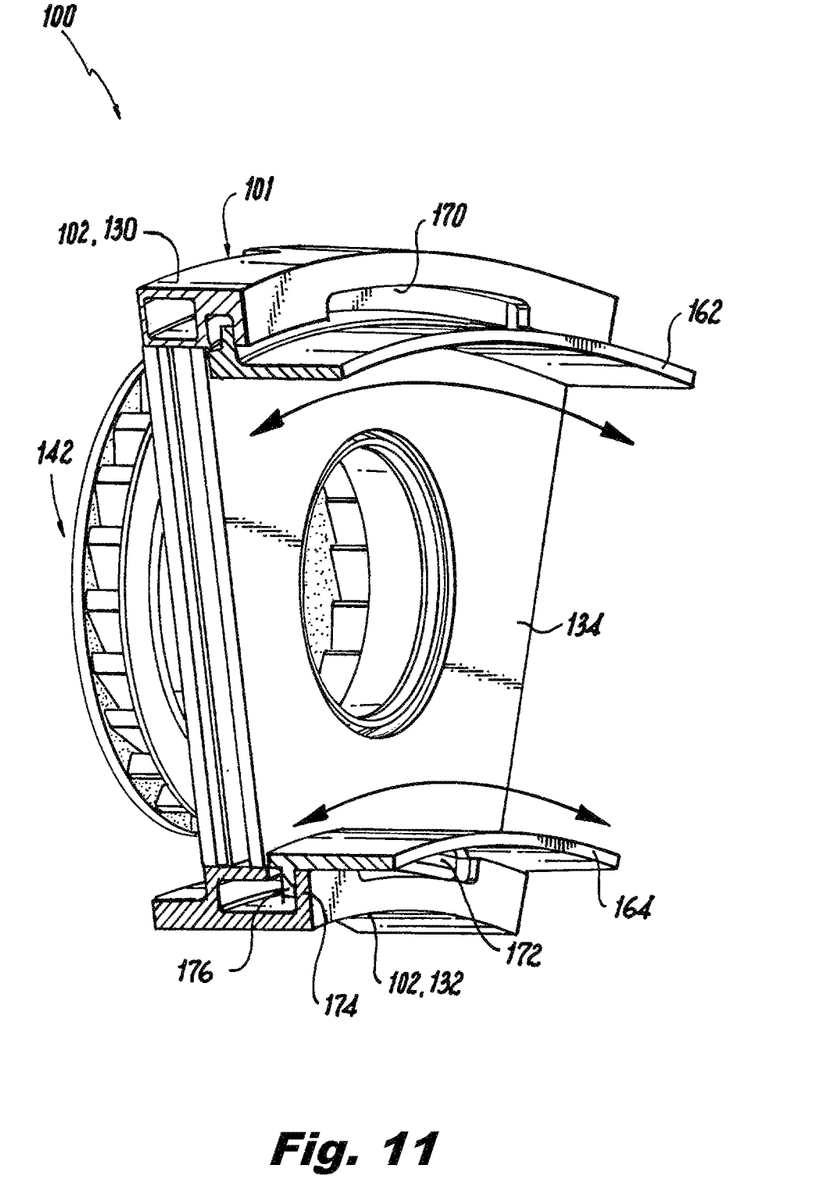
FIG. 11 is a perspective view of the portion of the combustion system of FIG. 7, schematically indicating engagement of the bayonet rings.
Figure 12:
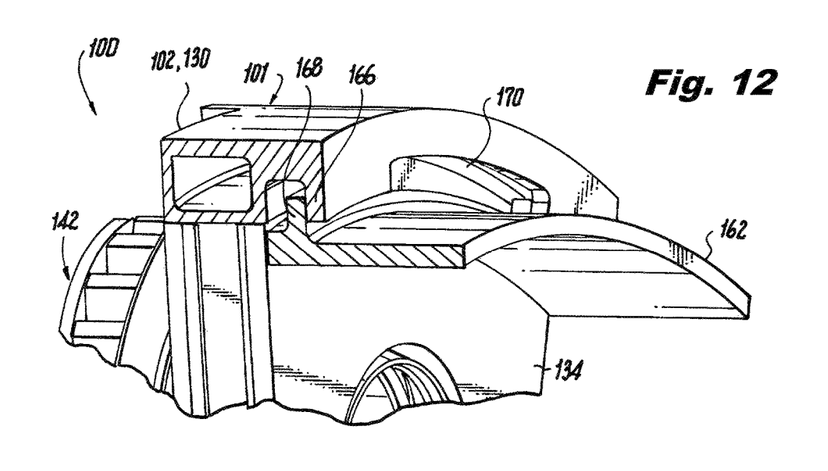
FIG. 12 is a perspective view of a portion of the combustion system of FIG. 11, showing the bayonet features.

Referring now to FIG. 11, each tile 134 is confined axially with the combustor dome 102, i.e. against movement in the direction D indicated in FIG. 6. The tiles 134 are confined axially by an outer bayonet ring 162 proximate the radially outer perimeter 150 defined by the tiles 134, and by an inner bayonet ring 164 proximate the radially inner perimeter 152 defined by the tiles 134. This allows tiles 134 to contract and expand radially under thermal cycles. Each of the bayonet rings 162 and 164 is a continuous ring, however it is also contemplated that split rings, or multiple ring segments could be used for one or both. Each of the bayonet rings 162 and 164 is interlocked with bayonet features in respective inner and outer rings 132 and 130 of the combustor dome 102 so that bayonet rings 162 and 164 can be engaged and disengaged from combustor dome 102 by rotation in the direction indicated by the double arrows in FIG. 11. FIG. 12 shows a bayonet feature 166 of the outer ring 130 of frame 101 interlocked with a bayonet feature 168 of outer bayonet ring 162. The bayonet feature 168 of outer bayonet ring 162 can be introduced into and removed from outer ring 130 through notch 170 defined in outer ring 130. Inner bayonet ring 164 and inner ring 132 of frame 101 have a similar engagement with bayonet features 174 and 176, and notch 172, which are shown in FIG. 11. Each nozzle has a corresponding arrangement of bayonet features 166, 168, 174, and 176, however it is also contemplated that some of the bayonet features can be eliminated as long as enough are included for secure tiles 134 in place.

Figure 13:
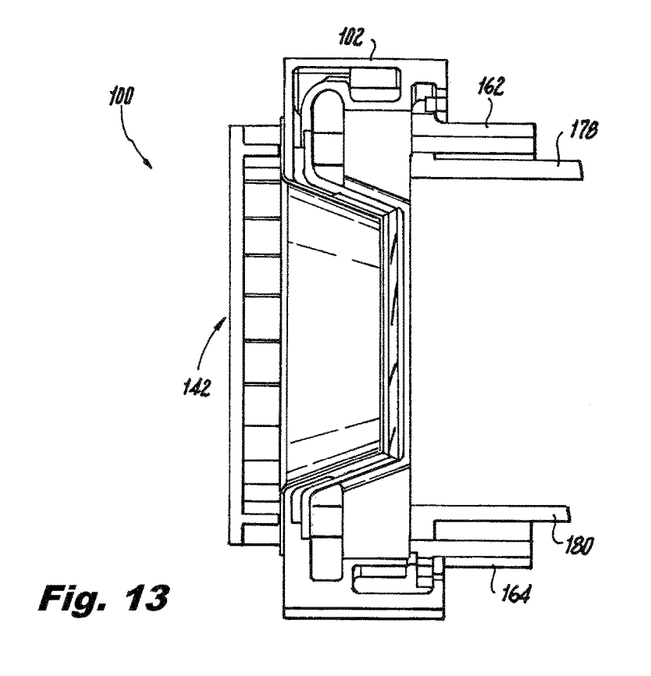
FIG. 13 is a radial cross-sectional elevation view of the portion of the combustion system of FIG. 11, showing the engagement of the bayonet rings with the inner and outer combustor walls.

With reference now to FIG. 13, outer bayonet ring 162 slidingly supports cold side combustor liner 178 of the outer combustor wall 106. Inner bayonet ring 164 slidingly supports cold side combustor liner 180 of the inner combustor wall 104. Those skilled in the art will readily appreciate that optionally the outer bayonet ring 162 can form a cold side combustor liner of the outer combustor wall 106, e.g., by making outer bayonet ring 162 and liner 178 integral, and that inner bayonet ring 164 can form a cold side combustor liner of the inner combustor wall 104, e.g., by making inner bayonet ring 164 integral and liner 180 integral. Bayonet rings 162 and 164 can be made of any suitable material including metallic or composite materials.

Any suitable material can be used for tiles 134, such as SiC, SiC ceramic matrix composite (CMC) material. SiC and SiC CMC materials are light weight and capable of withstanding very high temperatures typical of combustion without necessarily requiring active cooling. These materials conduct heat relatively well, so backside cooling as described above can be sufficient to protect against direct combustion heating. Adequate air flow through the nozzle provides sufficient backside cooling. These materials also simplify design due to their low coefficient of thermal expansion. Using a design with partitioned tiles as described herein helps decouple thermal growth differentials between the outer ring of the combustor dome and the tiles. The components of combustor dome arrangements described herein tend to be loaded in the axial direction, pushing the components together axially. Composite materials perform favorably under such loading. This coupled with the low thermal growth, which can beneficially match the low thermal growth of components conducting cool fuel therethrough, such as the fuel manifold 118, make composites a good material for elements such as radial swirler backside wall 143, tiles 134, and bayonet rings 162 and 164. Elements conducting fuel therethrough, such as frame 101 of combustor dome 102, can advantageously be metallic.

The nozzles and combustor domes described herein provide many potential advantages over the traditional configurations. The fuel nozzles can now integrate a large majority of the combustor and fuel manifold into the nozzle structure. The nozzles and combustor dome can be engineered for maintenance/replacement to coincide with the replacement of other engine components such as turbines, where the engine case must be opened. Therefore, the nozzles do not need to be small enough to be extracted through the case and combustor. The larger nozzles can provide advantages including more efficient mixing large amounts of fuel and air, and the nozzle air can be used to cool the combustor, simplifying combustor design. The combustor itself can be substantially simplified with combustor domes such as disclosed herein. Thermal mismatch between the combustor and engine case can be decoupled from the nozzle/combustor interface. The weight of heavy stems (feed arms or the like), flanges, and engine case reinforcement can be reduced or eliminated. Having the fuel manifold inside the engine, i.e. integrated in the combustor dome, means the fuel manifold resides closer to the nozzles, reducing the amount of wetted walls of the fuel system. Common features between the nozzles and combustor can be unitized for construction.

The methods and systems of the present disclosure, as described above and shown in the drawings, provide for combustion systems with superior properties including improved combustion efficiency, reduced weight, and reduction of fuel lines. While the apparatus and methods of the subject disclosure have been shown and described with reference to preferred embodiments, those skilled in the art will readily appreciate that changes and/or modifications may be made thereto without departing from the scope of the subject disclosure.

What is claimed is:
1. A combustion system comprising:
   an annular combustor dome comprising an inner dome ring and an outer dome ring;
   a plurality of circumferentially spaced apart nozzles;
   a plurality of tiles to fluidly separate a downstream side of the combustor dome from an upstream side of the combustor dome,
   wherein each tile is mounted around a respective one of the nozzles wherein each tile is spaced apart from the respective one of the nozzles in an axial direction between the upstream and downstream sides of the combustor dome to define an outer air circuit between the tile and the respective one of the nozzles;

wherein each nozzle includes a radial swirler on the upstream side of the combustor dome in fluid communication with a nozzle outlet on the downstream side of the combustor dome, wherein an inner air circuit is defined from the radial swirler to the nozzle outlet;

wherein struts supporting each nozzle in the combustor dome modestly obstruct flow only to the outer air circuit and the inner air circuit is unobstructed by the struts, wherein the struts are an integral part of, and extend radially from, the inner dome ring and the outer dome ring of the combustor dome to each respective nozzle; and wherein the tiles are confined axially by an outer bayonet ring proximate a radially outer perimeter defined by the tiles, and by an inner bayonet ring proximate a radially inner perimeter defined by the tiles, wherein each of the bayonet rings is interlocked with bayonet features in a respective one of the inner dome ring and outer dome ring.

2. A combustion system as recited in claim 1, wherein each nozzle includes a downstream insulation shell with a standoff extending in a downstream direction from the nozzle, wherein the standoff spaces the tile from the nozzle to maintain space for the outer air circuit.

3. A combustion system as recited in claim 2, wherein each tile includes a radial slot that receives the standoff.

4. A combustion system as recited in claim 1, wherein each tile defines a converging frustoconical surface that defines a portion of the outer air circuit.

5. A combustion system as recited in claim 1, wherein the inner and outer air circuits are configured to issue 40% to 50% of airflow passing through the combustor dome through the inner air circuit, and to issue 50% to 60% of the airflow through the outer air circuit, wherein the total airflow of the inner and outer airflow circuits does not exceed 100%.

6. A combustion system as recited in claim 1, wherein a channel forming the inlet of the outer air circuit is proximate an upstream surface of the tile for cooling of the tile by airflow passing into the outer air circuit.

7. A combustion system as recited in claim 1, wherein each tile includes a radial edge with a radially extending groove defined therein, wherein each tile includes a radial edge with a radially extending tongue thereon, and wherein each tile engages circumferentially adjacent neighbor tiles wherein the tongues are engaged in the grooves.

8. A combustor system as recited in claim 1, wherein each tile includes a ceramic matrix composite (CMC) material.

9. A combustor for a gas turbine engine comprising:
an inner combustor wall;
an outer combustor wall radially outboard of the inner combustor wall,
wherein the inner and outer combustor walls define a combustion space therebetween with an upstream inlet and a downstream outlet;
and a combustor dome connecting between inner and outer combustor walls at the upstream inlet of the combustion space,
the combustor dome comprising an inner dome ring and an outer dome ring;
a plurality of circumferentially spaced apart nozzles;
a plurality of tiles to fluidly separate a downstream side of the combustor dome from an upstream side of the combustor dome,
wherein each tile is mounted around a respective one of the nozzles,
wherein each tile is spaced apart from the respective one of the nozzles in an axial direction between the upstream and downstream sides of the combustor dome to define an outer air circuit between the tile and the respective one of the nozzles;
wherein each nozzle includes a radial swirler on the upstream side of the combustor dome in fluid communication with a nozzle outlet on the downstream side of the combustor dome, wherein an inner air circuit is defined from the radial swirler to the nozzle outlet;
wherein struts supporting each nozzle in the combustor dome modestly obstruct flow only to the outer air circuit and the inner air circuit is obstructed by the struts,
wherein the struts are an integral part of, and extend radially from, the inner dome ring and the outer dome ring of the combustor dome to each respective nozzle; and
wherein the tiles are confined axially by an outer bayonet ring proximate a radially outer perimeter defined by the tiles, and by an inner bayonet ring proximate a radially inner perimeter defined by the tiles, wherein each of the bayonet rings is interlocked with bayonet features in a respective one of the inner dome ring and outer dome ring.

10. A combustor as recited in claim 9, wherein the outer bayonet ring slidingly supports a cold side combustor liner of the outer combustor wall, and wherein the inner bayonet ring slidingly supports a cold side combustor liner of the inner combustor wall.

11. A combustor as recited in claim 9, wherein the outer bayonet ring forms a cold side combustor liner of the outer combustor wall, and wherein the inner bayonet ring forms a cold side combustor liner of the inner combustor wall.

* * * * *